United States Patent
Turan et al.

(10) Patent No.: US 11,822,469 B2
(45) Date of Patent: Nov. 21, 2023

(54) METHOD FOR VALIDATING SOFTWARE FUNCTIONS IN A DRIVER ASSISTANCE SYSTEM FOR MOTOR VEHICLES

(71) Applicant: Robert Bosch GmbH, Stuttgart (DE)

(72) Inventors: Achim Turan, Leonberg (DE); Matthias Brettschneider, Stuttgart (DE); Ulf Wilhelm, Schwaikheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 133 days.

(21) Appl. No.: 17/646,369

(22) Filed: Dec. 29, 2021

(65) Prior Publication Data

US 2022/0222172 A1    Jul. 14, 2022

(30) Foreign Application Priority Data

Jan. 13, 2021    (DE) ...................... 10 2021 200 257.9

(51) Int. Cl.
*G06F 11/36*    (2006.01)
*B60W 50/04*    (2006.01)

(52) U.S. Cl.
CPC ......... *G06F 11/3692* (2013.01); *B60W 50/04* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 8,532,944 B2 * | 9/2013 | Vetter | H04L 41/0869 702/57 |
| 11,409,304 B1 * | 8/2022 | Cai | B60W 60/001 |
| 11,702,106 B1 * | 7/2023 | Poubel Orenstein | B60W 50/0097 701/26 |
| 2002/0077779 A1 * | 6/2002 | Liebl | G01R 31/319 702/183 |
| 2017/0161414 A1 * | 6/2017 | Kible | G06F 30/20 |
| 2019/0322286 A1 * | 10/2019 | Stefan | B60W 60/001 |

(Continued)

FOREIGN PATENT DOCUMENTS

| | | | | |
|---|---|---|---|---|
| CN | 112783137 A | * | 5/2021 | |
| DE | 102007053501 A1 | * | 1/2009 | ........ G01M 17/007 |

(Continued)

*Primary Examiner* — Philip Wang
(74) *Attorney, Agent, or Firm* — NORTON ROSE FULBRIGHT US LLP; Gerard Messina

(57) ABSTRACT

A method for validating software functions in a driver assistance system for motor vehicles. The method includes: a) recording input data of at least one system group to be tested, the input data being adapted to a first configuration of the system group to be tested; b) supplying the recorded data to the software of the system group to be tested in a second configuration and simulating the function of this system group in this second configuration; and c) comparing the system responses occurring during the simulation using predefined setpoint criteria. The input data recorded in step a) are combined in a data object, which has a predefined data structure, with configuration data, which describe the first configuration, and during the validation of the functions of the system group in the second configuration, the data supplied in step b) are generated from the contents of this data object.

8 Claims, 6 Drawing Sheets

(56) References Cited

U.S. PATENT DOCUMENTS

| | | | | |
|---|---|---|---|---|
| 2019/0354643 A1* | 11/2019 | Shum | ................ | G06F 30/20 |
| 2020/0174433 A1* | 6/2020 | Hughes | ................ | G06F 16/282 |
| 2021/0374438 A1* | 12/2021 | Shmueli | ................ | G01S 7/52004 |

FOREIGN PATENT DOCUMENTS

| | | | | |
|---|---|---|---|---|
| EP | 2950074 B1 * | 6/2020 | ........ | G01M 17/007 |
| KR | 2018078697 A * | 7/2018 | ........ | G06F 11/3688 |
| KR | 20210072824 A * | 11/2019 | | |
| WO | WO-2020097221 A1 * | 5/2020 | ............ | B60K 35/00 |

* cited by examiner step a)

step b)

METHOD FOR VALIDATING SOFTWARE FUNCTIONS IN A DRIVER ASSISTANCE SYSTEM FOR MOTOR VEHICLES

CROSS REFERENCE

The present application claims the benefit under 35 U.S.C. § 119 of German Patent Application No. DE 102021200257.9 filed on Jan. 13, 2021, which is expressly incorporated herein by reference in its entirety.

FIELD

The present invention relates to a method for validating software functions in a driver assistance system for motor vehicles, including the steps:
a) recording input data of at least one system group of the driver assistance system to be tested during a real or simulated operation of at least one upstream system group, the input data being adapted to a first configuration of the system group to be tested;
b) supplying the recorded data to the software of the system group to be tested in a second configuration and simulating the function of this system group in this second configuration; and
c) comparing the system responses occurring during the simulation using predefined setpoint criteria.

BACKGROUND INFORMATION

A driver assistance system for motor vehicles, for example an adaptive cruise control, an automatic emergency brake system, a lane keeping system or the like, or also a combination of all these systems, includes sensory components, for example radar sensors, cameras, etc., actuating components for control interventions into the drive system, the brake system, the steering, etc., and an electronic data processing system, including associated software, which controls the sensory components, processes sensor data and generates control commands for the actuating components therefrom.

During the course of a continuous improvement of the driver assistance systems and an increase in the functional scope and the performance of these systems, the software is continuously further developed, and the further developed software versions must then be transferred to the driver assistance systems with the aid of software updates. However, before a new software version may be integrated into the driver assistance systems, a careful validation is required for safety reasons, in which the functions of the new software are tested to check whether the new software meets at least the requirements which the old software had already met, and whether the improvements targeted by the modification of the software are really achieved.

In principle, a validation of this type may take place in that it is checked during test drives whether the system responses meet the predefined setpoint criteria. For example, in an automatic emergency brake system, it may be checked during the validation whether the frequency of the erroneous triggering events remains below a certain threshold value. Statistically meaningful results are, however, to be obtained in this way only after a great many test kilometers driven, so that the validation of the software using real test drives is extremely complex and expensive.

Methods of the type mentioned at the outset have therefore been developed, in which the sensor data obtained during a real test drive are recorded, and these data are used later on to emulate the test drive during the testing of a new software version.

In the conventional methods, the input data are generally the sensor data, the upstream system group is the sensor system, and the system group to be tested is the driver assistance system as a whole, with the exception of the sensors and the actuators.

The system software of a driver assistance system is made up of a highly complex network of interacting and, in part, also hierarchically structured system components and subcomponents. Since the behavior of an individual component is dependent on the input which it obtains from other system components, it is difficult to test the functions of an individual component in an isolated manner under realistic conditions. Up to now, the validation has therefore generally taken place for the system software as a whole, even if only one individual component was changed in the update.

The emulation of test drives with the aid of recorded sensor data also reaches limits if, during the course of the further development, the software was changed to such a great degree that the formats of the recorded data are no longer compatible with the data formats required by the new software. In this case, the previous complex real test drives are again necessary.

SUMMARY

An object of the present invention is to provide a validation method, which permits a more efficient development and validation of the software.

This object may be achieved according to an example embodiment of the present invention in that the input data recorded in step a) are combined with configuration data, which describe the first configuration, in a predefined data object, which has a predefined data structure, and that, during the validation of the functions of the system group in the second configuration, the data supplied in step b) are generated from the contents of the data object.

Since the data object contains not only the recorded data, but also information about the previous configuration of the system group to be tested and thus implicitly or explicitly also about the data formats used in the previous configuration, it is possible to convert the format of the recorded data into the format required by the new configuration during the generation of the input data.

In this way, it may be achieved that the input data obtained during complex test drives still remain usable even in the case of more radical changes to the software.

However, the configuration data contained in the data object do not have to refer only to the required data formats but may also refer to other aspects of the configuration.

In one specific embodiment of the present invention, the system software of the driver assistance system as a whole is described as a network of interacting components, and the system group to be tested may also be a subcombination of the overall system made up of one or multiple of these components. The input of other components, which do not belong to the tested system group, is then also emulated like the sensor data. The input data recorded in the data object, hereinafter referred to as emulation container or, in short, as container, are then not made up of the sensor data or not only thereof, but also include the input of other system components, which do not belong to the tested system group. The configuration data which are also contained in the container then specify the components of the system group to be tested, to which these data are transferred, as well as possibly the relationships between these components.

For example, the entire input received by an individual system component may thus be recorded in an emulation container during a real or emulated test drive, and if only the software of this individual system component is changed during a software update, the emulation container supplies the input data which make it possible to validate this component in an isolated manner. In this way, it is possible to divide the validation process for the overall system into a chain of validation steps, in which a different configuration of system groups is validated in each case. The results obtained during a validation step are then stored together with the configuration data in a container and are used in the next step to generate the input data for the system group tested in the next step. This not only permits a greater efficiency in the cases in which only some or a few components of the software were changed, but also permits a faster and more targeted troubleshooting, because the defective system group may be more easily localized by the isolated validation of different system groups.

Exemplary embodiments are explained in greater detail below, based on the figures.

DETAILED DESCRIPTION OF EXAMPLE EMBODIMENTS

Figure 1A:
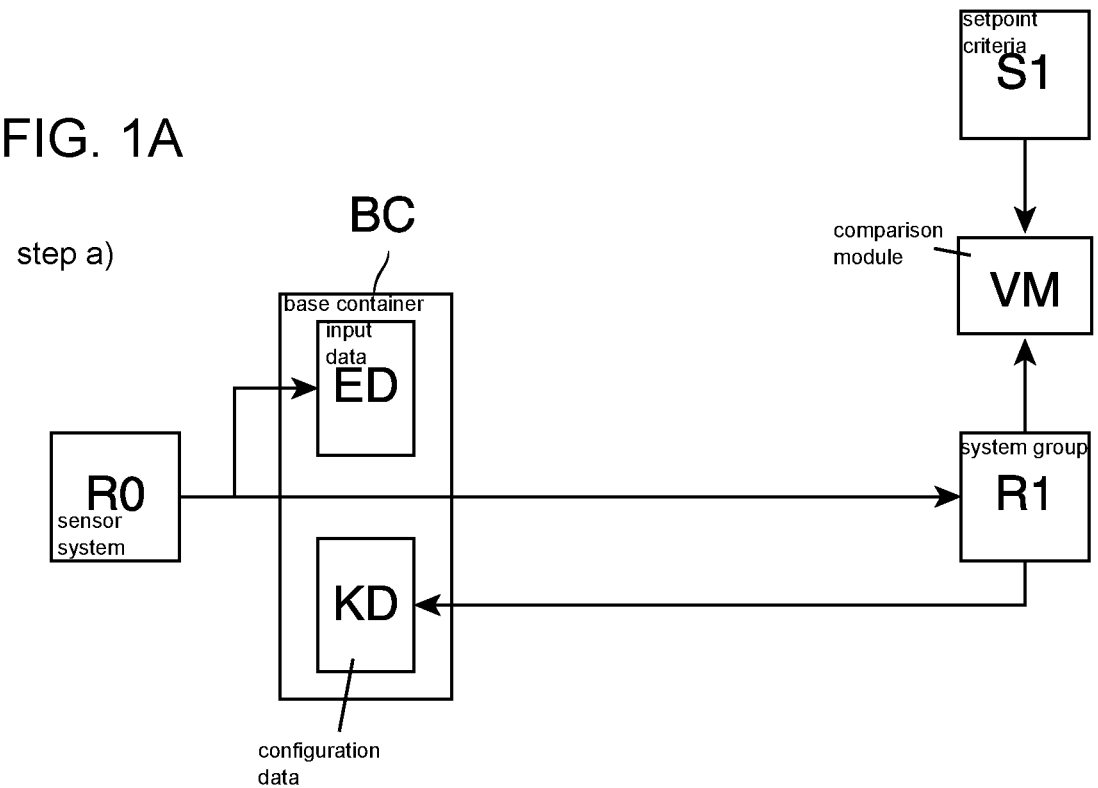
FIGS. 1A and 1B together show a block diagram which illustrates two steps of a validation method according to an example embodiment of the present invention.
Figure 1B:
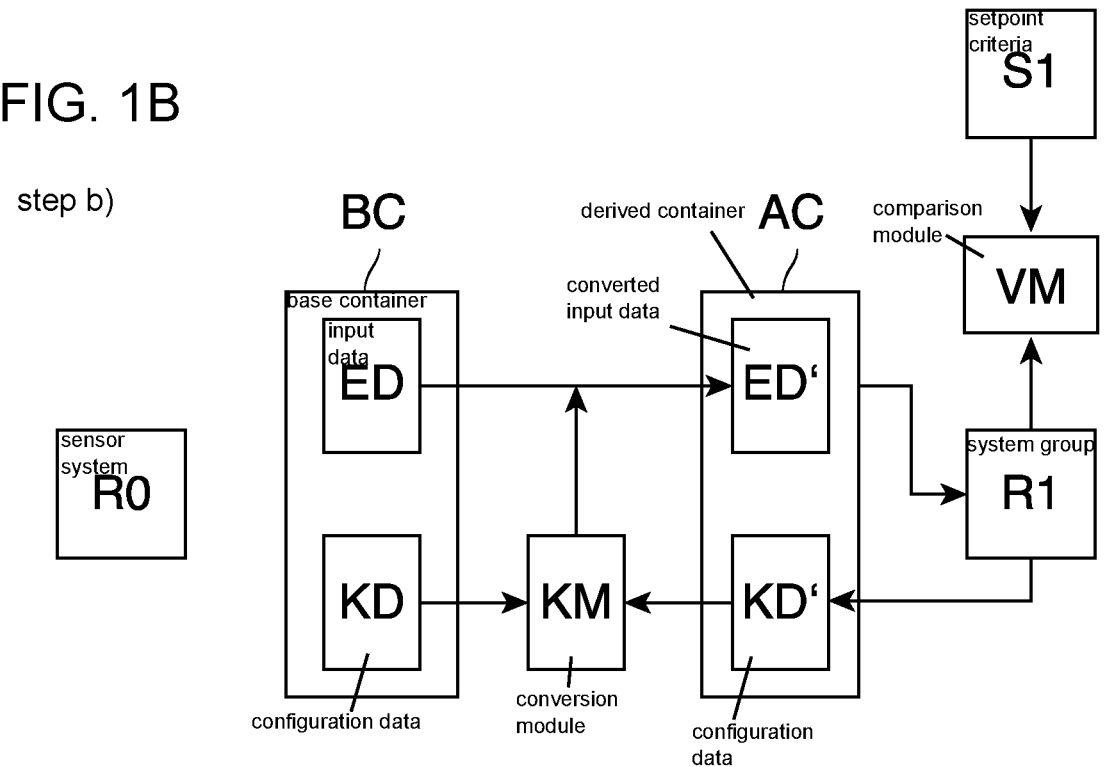

FIGS. 1A and 1B show two steps of a validation method according to the present invention, with the aid of which the functions of a system group R1 of a driver assistance system of a motor vehicle are tested and validated. System group R1 may be, for example, the complete software of the driver assistance system, which receives data from a sensor system R0. A first step a) shown in FIG. 1A of the method is carried out during a test drive using a vehicle, in which the driver assistance system, including the software to be tested, is installed. During the drive, sensor system R0, for example a radar sensor, supplies its sensor data to system group R1 to be tested. The system responses generated by system group R1, in particular commands of the actuating system components of the driver assistance system, are compared in a comparison module VM with setpoint criteria S1, which characterize the desired system behavior. The software is considered to be successfully validated when the system responses supplied by system group R1 match the setpoint criterion.

During the drive, the sensor data of sensor system R0 are also transferred to a data object, which is referred to as base container BC. The sensor data are recorded in this base container throughout the entire drive and stored as input data ED for a later validation step. Configuration data KD of system group R1 to be tested, which identify the configuration, for example the software version, of system group R1, are also stored in base container BC.

The actual validation with the aid of comparison module VM does not have to take place during the drive, but may also occur at a later point in time, based on the input data stored in base container BC.

In a step b) shown in FIG. 1B, system group R1 to be tested is revalidated once the system software has been changed in a software update. However, no new test drive is necessary for this revalidation, and sensor system R0 is not needed, since input data ED stored in base container BC may be used for the validation. In this example, however, it should be assumed that the software of system group R1 was changed during the update in such a way that the data format of input data ED is no longer compatible with the system software, so that system group R1 is not able to process this data directly. As a simple example, it may be assumed that numeric values, which form a part of input data ED, are stored in base container BC in integer format, while system group R1 now expects floating point numbers. For this reason, input data ED are converted into the desired format and stored as converted input data ED' in a data object, which is referred to as derived container AC. The conversion takes place automatically with the aid of a conversion module KM, which reads configuration data KD for the old software version from base container BC and, after the update, reads configuration data KD' from derived container AC, which were stored there by system group R1. In this way, the validation may be carried out despite the incompatibility of the software versions with the aid of input data ED, which were recorded in step a) shown in FIG. 1A.

Converted input data ED' do not absolutely have to be stored in derived container AC but may optionally also be transferred by conversion module KM directly to system group R1 to be tested.

Figure 2:
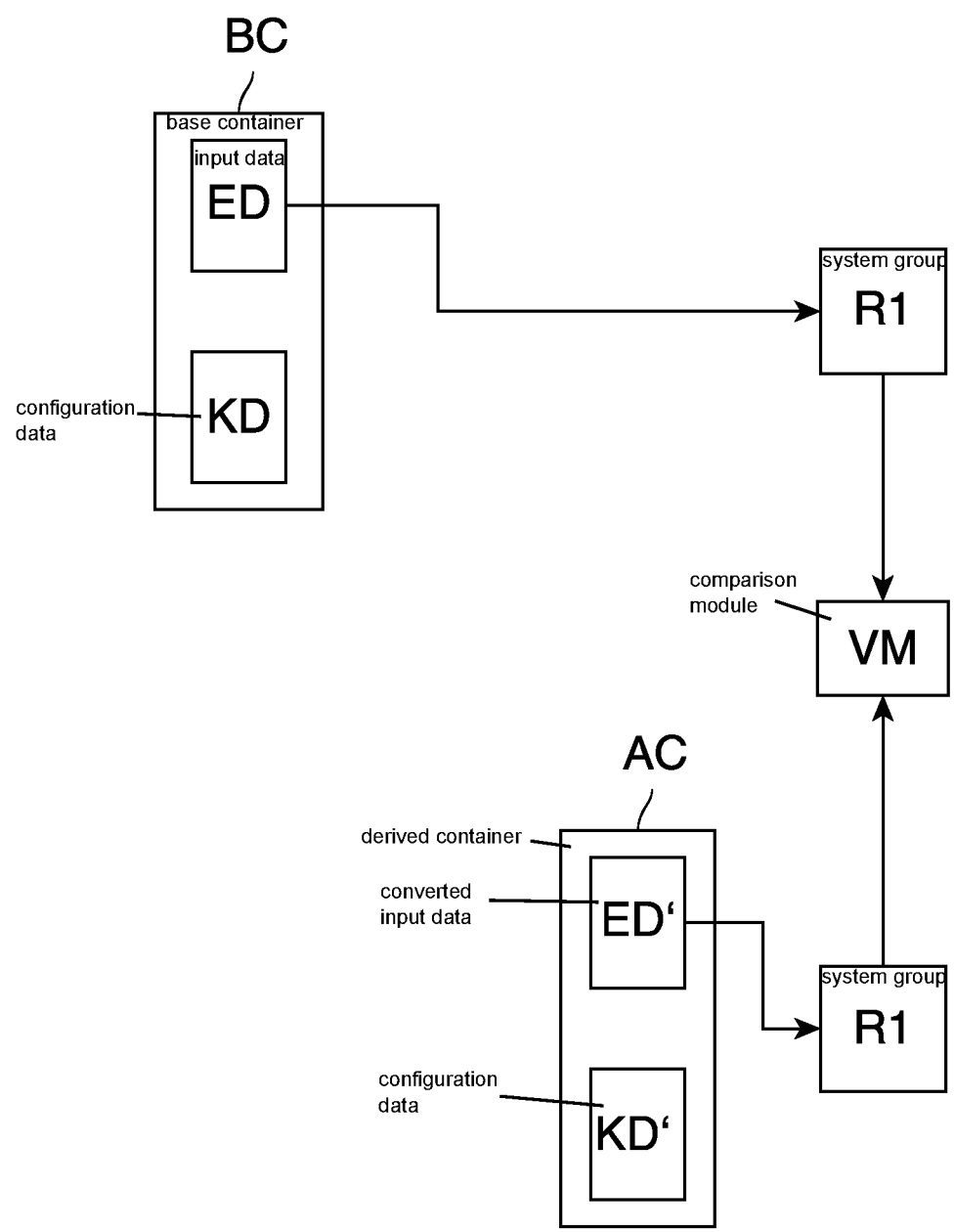
FIG. 2 shows a block diagram for a validation process, in which the performances of two software versions are compared with each other with the aid of emulated test situations, in accordance with an example embodiment of the present invention.

FIG. 2 illustrates an example of a validation method, in which the system responses of two different configurations (software versions) of system group R1 are compared directly with each other. In addition, no new test drive is carried out, but the test drive for the first software version is emulated with the aid of data stored in base container BC, and the test drive for the system group including the new software version is emulated with the aid of the data stored in derived container AC. The two emulations run in parallel, so that the system responses may be compared directly by comparison module VM. In this way, it may be established whether the changes made to the software have caused any undesirable changes in the system behavior.

Figure 3:
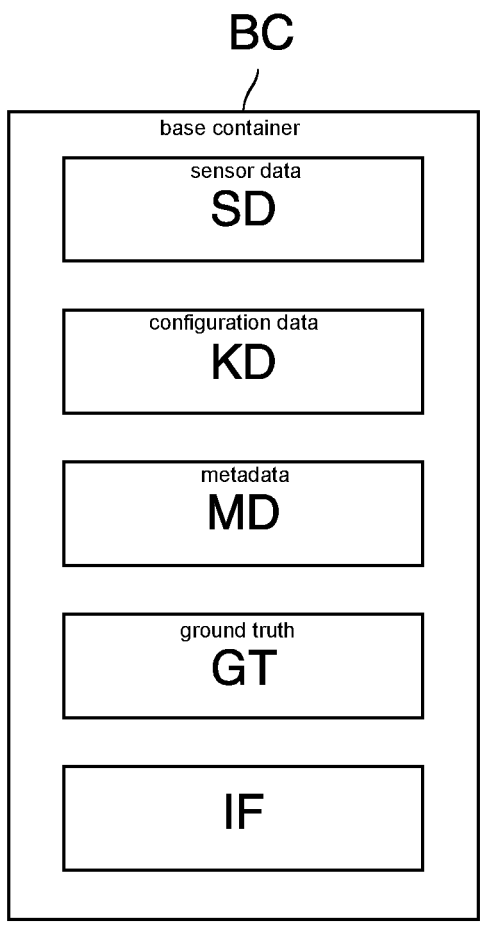
FIG. 3 shows a data structure of a base container, which is used to generate emulated sensor data, in accordance with an example embodiment of the present invention.

An example of the data structure of base container BC is shown in FIG. 3. This container contains the input data, which, in this case, are sensor data SD of sensor system R0 as well as configuration data KD. These configuration data specify, in particular, the configuration (software version and other relevant configuration features) of the system group to be tested. However, configuration data may optionally also be stored, which relate to the upstream system group, in this case, thus, sensor system R0.

In the illustrated example, base container BC additionally contains further data, which describe detailed circumstances of the test drive, in which the sensor data were recorded and which may be relevant for the validation. For example, these data may have an influence on which setpoint criteria are to be used during the validation. In this case, comparison module VM will also access the data in base container BC.

In the illustrated example, these additional data include metadata MD, for example attributes, which characterize tunnel drives, the weather conditions during the test drive and the like, and so-called ground truth GT, i.e. data which reflect what is really happening during the test drive. This includes, in particular, infrastructure data, which describe the terrain traversed during the test drive in the form of a digital map, as well as recorded data relating to interventions on the part of the human driver in the vehicle guidance.

A development environment for the software development may be viewed as a complex network, whose nodes are the individual components of the system software, the comparison modules, conversion modules and containers, which communicate with each other via interfaces.

Figure 4:
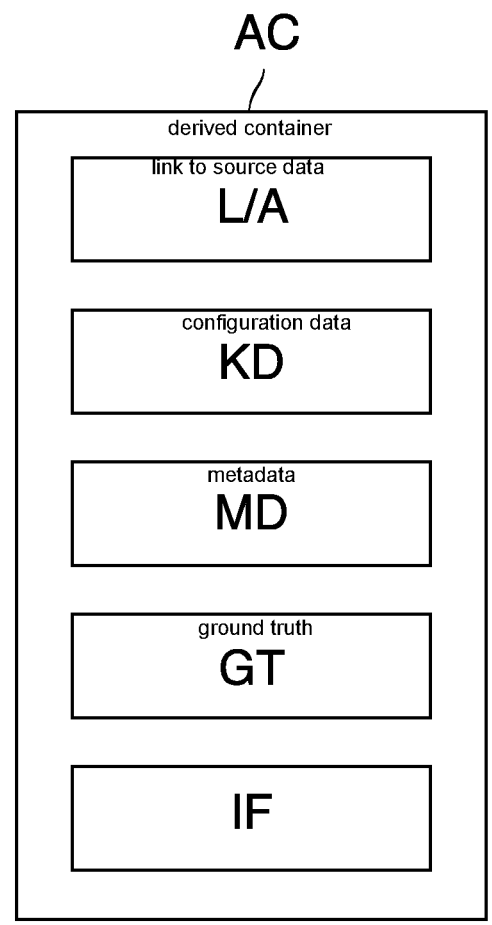
FIG. 4 shows a data structure of a derived container, which is used to generate input data for a system group to be tested from the data of a base container or another derived container, in accordance with an example embodiment of the present invention.

FIG. 4 shows an example of a data structure of derived container AC. Instead of the input data, this derived container may contain a link L/A to a data source, from which the input data may be drawn, possibly combined with a link to a conversion module or adapter for adapting the data formats. Incidentally, the data structure is the same as in base container BC (some of the contents being able to be different).

An example of a validation process for a system software is to be described below, based on FIGS. 5 through 10, which includes a multiplicity of interacting software components, which are also to be validated independently of each other. In this case, the system group to be tested is not the entire driver assistance system, but includes different combinations and configurations of the individual components, depending on the validation task.

Figure 5:
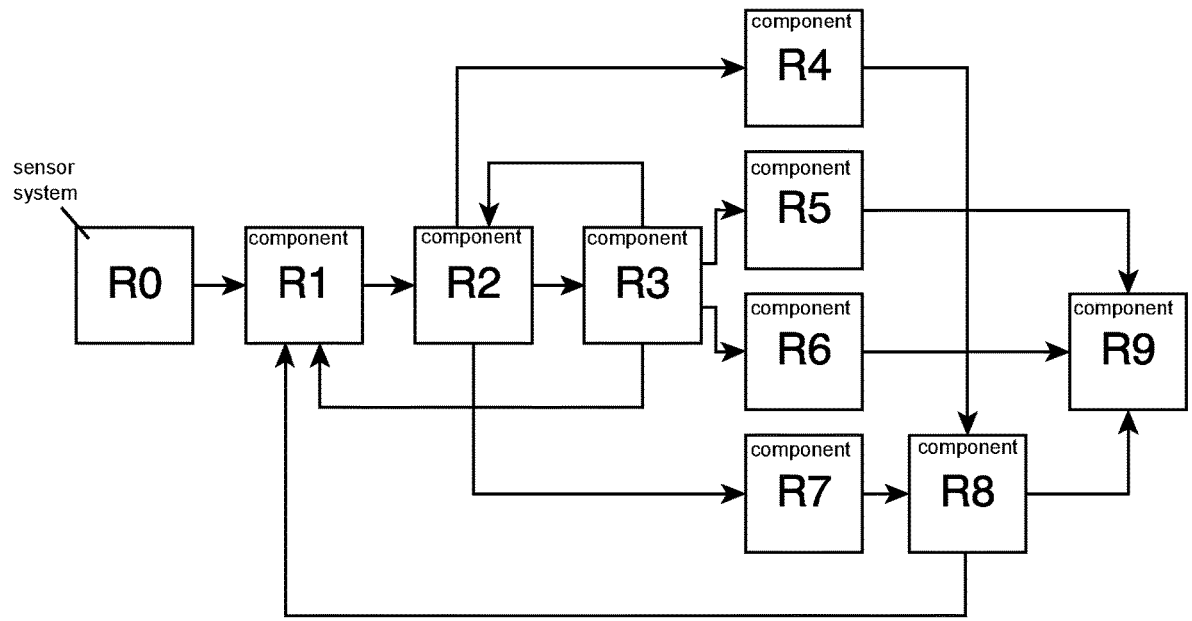
FIG. 5 shows a diagram of a system software having a modular structure, in accordance with an example embodiment of the present invention.

FIG. 5 shows a block diagram of the components of the overall system, which, in this example, includes sensor system R0 as well as nine components R1 through R9 of the system software of the driver assistance system. The data flows between the different components are represented by arrows. It is apparent that there are also feedback loops in this system. For example, a data flow from R1 to R3 via R2 is fed back to R1. On the whole, component R1 contains input not only from sensor system R0, but also from components R3 and R8.

Figure 6:
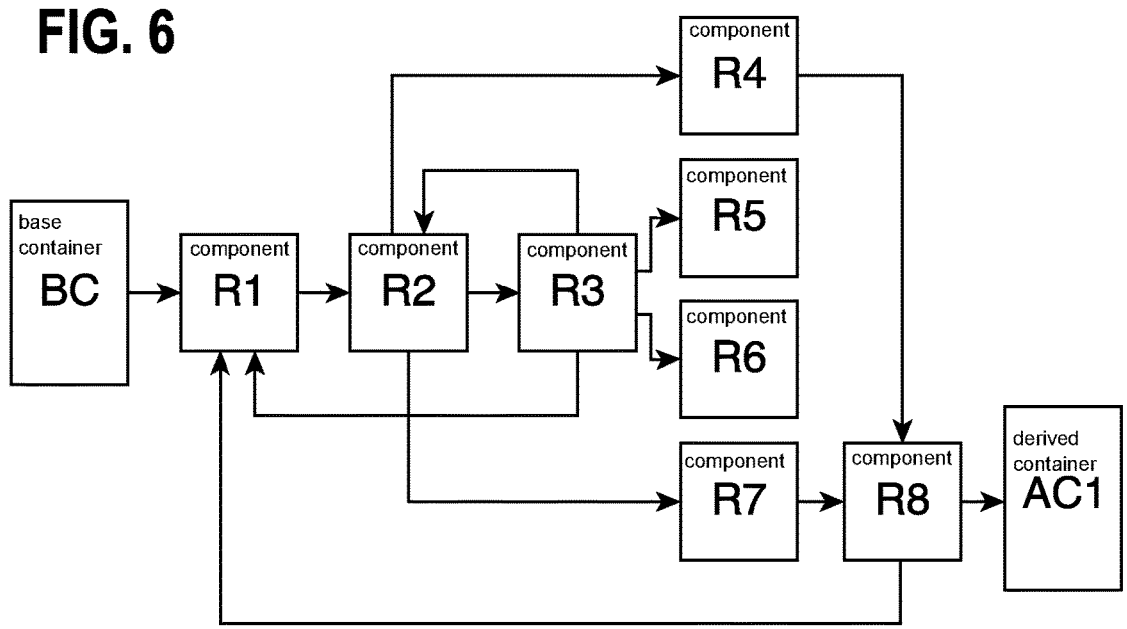
FIGS. 6 and 7 show diagrams of two validation steps for different system groups, which are each part of the system software illustrated in FIG. 5.

FIG. 6 illustrates a first validation step, in which a derived container AC1 is generated, which records the output of component R8. At the same time or at a later point in time, it may be checked whether this output of component R8 matches the setpoint criteria. Component R8 receives input indirectly or directly from components R1, R2, R3, R4 and R7. These components thus form the system group to be tested. The configuration data of this system group indicate, among other things, which components are involved and which communication relationships exist between them and to which component(s) the input data are to be transferred. This is component R1 in the illustrated example. In this validation step, the input for this component is generated by emulation with the aid of base container BC.

Figure 7:
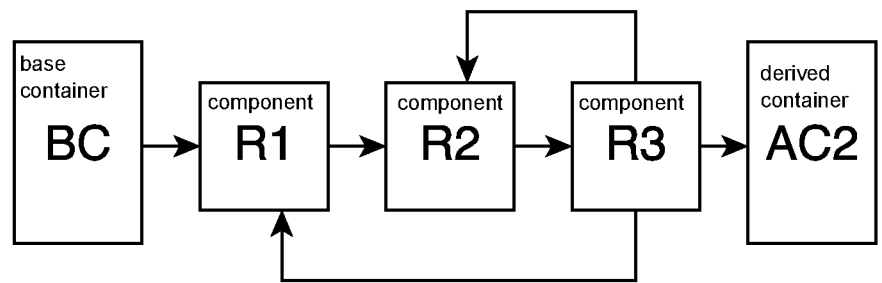
Figure 8:
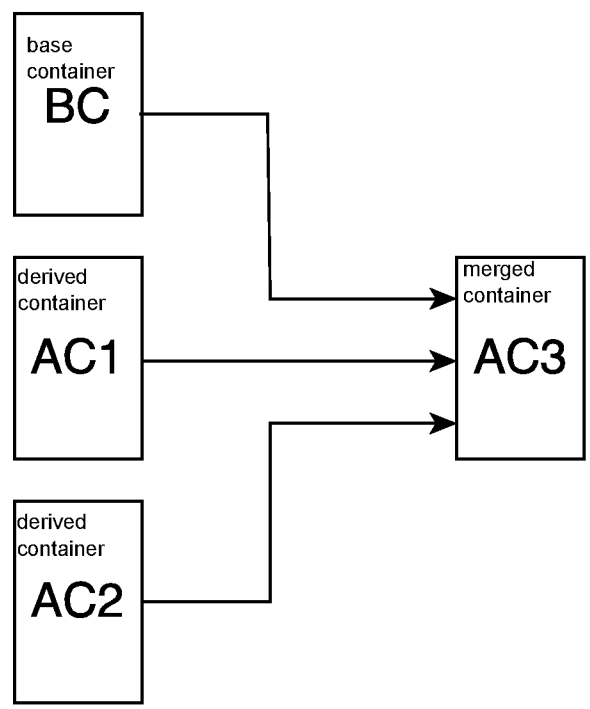
FIG. 8 shows a diagram, which illustrates the merging of three containers into a new derived container, in accordance with an example embodiment of the present invention.

FIG. 7 shows an emulation step, in which the tested system group is made up only of components R1, R2 and R3. The input for component R1 is generated from the data of base container BC, and the output of component R3 is stored in a derived container AC2. This output may be validated at the same time or later on.

The time sequence between the validation steps in FIGS. 6 and 7 is arbitrary. In each case, three containers are available after these validation steps are carried out, namely base container BC and derived containers AC1 and AC2. As illustrated schematically in FIG. 8, these three containers are now merged into a larger derived container AC3, which contains the data of all three containers (or refers to them).

Figure 9:
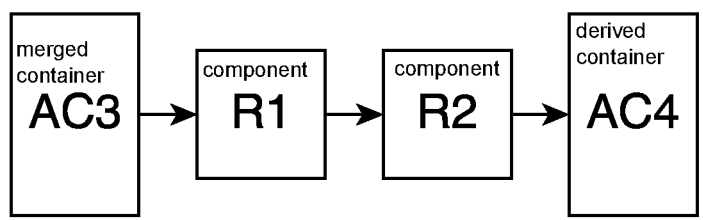
FIGS. 9 and 10 show diagrams of two further validation steps, in accordance with an example embodiment of the present invention.

FIG. 9 shows a subsequent validation step, in which the system group to be tested is made up only of components R1 and R2. In this case, however, the input for component R1 is made up not only of the contents of base container BC, but also the contents of merged container AC3, and thus represents the entire input in component R1 (cf. FIG. 5).

The output to be validated of the system group tested in FIG. 9 is the output of R2 and is stored in a new derived container AC4.

Figure 10:
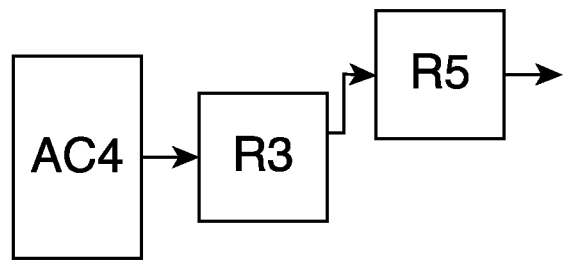

FIG. 10 illustrates a further validation step, in which the tested system group is made up of components R3 and R5. The input for component R3 is generated from the contents of container AC4 and represents the entire input of this component (cf. FIG. 5), including the input arising due to the feedback of the output from R3 to R1 and R2 and stored in container AC2 (FIG. 7). The output of component R5 may be validated in the validation step according to FIG. 10. A further derived container may be optionally generated, which then supplies the input for the validation of further system groups which contain components R5, R6 and R9, similarly to the principle described above.

As shown in FIG. 6, container AC1 is not influenced by any output of components R5 and R6. Likewise, the output of components R5 and R6 does not have any influence on the contents of container AC2 (FIG. 7), AC3 (FIG. 8) and AC4 (FIG. 9). If, for example, only component R5 is changed in a software update, it is sufficient to carry out the validation step according to FIG. 10 and to emulate the entire system behavior of the remaining system components with the aid of the contents of container AC4, since the contents of this container were not influenced by the change. In this way, the emulation process is simplified, in particular in the cases in which only individual components of the system were changed.

Conversely, if an error is now established during a test of the overall system (output of component R9 in FIG. 5), whose cause is unknown, this error may be more easily localized, in that the validation step according to FIG. 6 is first carried out. If it is shown that the contents of container AC1 correspond to the setpoint criteria, this indicates that the error is not likely to be due to a malfunction of one of components R1 through R4, R7 and R8, but which may instead be based on a malfunction of one of the other components.

What is claimed is:

1. A method for validating software functions in a driver assistance system for motor vehicles, comprising the following steps:
 a) recording input data of at least one system group to be tested of the driver assistance system during a real or simulated operation of at least one upstream system group, the input data being adapted to a first configuration of the system group to be tested;

b) supplying the recorded data to software of the at least one system group to be tested in a second configuration and simulating a function of the at least one system group in the second configuration; and c) comparing system responses occurring during the simulation using predefined setpoint criteria;

wherein the input data recorded in step a) are combined in a data object, which has a predefined data structure, with configuration data which describe the first configuration, and, during the validation of the software functions of the at least one system group in the second configuration, the data supplied in step b) are generated from contents of the data object.

2. The method as recited in claim 1, wherein the configuration data include data which specify data formats used or required in the first configuration, and in which the input data recorded in step a) are converted into data having a different data format.

3. The method as recited in claim 1, wherein system software of the driver assistance system is described as a network of multiple interacting components, the at least one system group to be tested is made up of a selection of the components, and a system group upstream from the at least one system group to be tested contains at least one of the other components.

4. The method as recited in claim 3, wherein the configuration data include data which identify the components belonging to the at least one system group to be tested.

5. The method as recited in claim 4, wherein a validation process for the validating is divided into multiple validation steps, output of a system group tested in a validation step is recorded in a data object, and input data for a system group to be tested in a later validation step are generated from the data object.

6. The method as recited in claim 5, wherein the system group to be tested in the validation step is formed from a component whose output is to be validated and from those remaining components which influence the output from the component.

7. The method as recited in claim 5, wherein a second data object, which contains output of another component, is provided for a component whose input is generated from a first data object, and the output of the other component and input data for the system group to be tested in the later validation step is generated from the second data object.

8. The method as recited in claim 5, in which data objects, which contain output of two other components, are combined with each other into a merged data object for a first component, whose input is generated from the output of the two other components, and an input for the first component is generated from the merged data object in a validation step for a system group, which contains the first component.

* * * * *